(12) United States Patent
Zhang et al.

(10) Patent No.: US 8,353,776 B2
(45) Date of Patent: Jan. 15, 2013

(54) UNIVERSAL BALL JOINT

(75) Inventors: Guo-Qing Zhang, Shenzhen (CN); Zhi-Ming Zhao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 162 days.

(21) Appl. No.: 12/978,650

(22) Filed: Dec. 27, 2010

(65) Prior Publication Data

US 2011/0294584 A1 Dec. 1, 2011

(30) Foreign Application Priority Data

May 28, 2010 (CN) .......................... 2010 1 0185478

(51) Int. Cl.
*F16D 3/10* (2006.01)

(52) U.S. Cl. ...................................... 464/106; 403/122

(58) Field of Classification Search .................... 464/15, 464/106, 147, 150, 151; 403/122, 141–143
See application file for complete search history.

(56) References Cited

U.S. PATENT DOCUMENTS 5,573,463 A * 11/1996 Arlt ............................ 464/147 X
2005/0123345 A1 * 6/2005 Trotter et al. ................. 403/122

FOREIGN PATENT DOCUMENTS

CN 1256208 C 5/2006
CN 101109407 A 1/2008

* cited by examiner

*Primary Examiner* — Gregory Binda
(74) *Attorney, Agent, or Firm* — Altis Law Group, Inc.

(57) ABSTRACT

A universal ball joint includes a first pivotal body and a second pivotal body rotatably assembled with the first pivotal body. The first pivotal body includes a substantially elliptical ball head and a connecting portion extending out from the ball head. The ball head has a major axis and a minor axis substantially perpendicular to the major axis. The second pivotal body defines a substantially elliptical ball socket rotatably engaging with the ball head of the first pivotal body such that the ball head may rotate around the major axis or the minor axis of the ball head.

13 Claims, 5 Drawing Sheets

UNIVERSAL BALL JOINT

BACKGROUND

1. Technical Field

The present disclosure relates to joint structures, and more particularly to an improved universal ball joint capable of transmitting high torsional torque.

2. Description of Related Art

Universal ball joint structures are well known in the art and are widely used in a variety of different applications to rotatably connect two parts together. However, the commonly used universal ball joint has a complicated structure and cannot transmit high torsional torque in use.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the universal ball joint. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
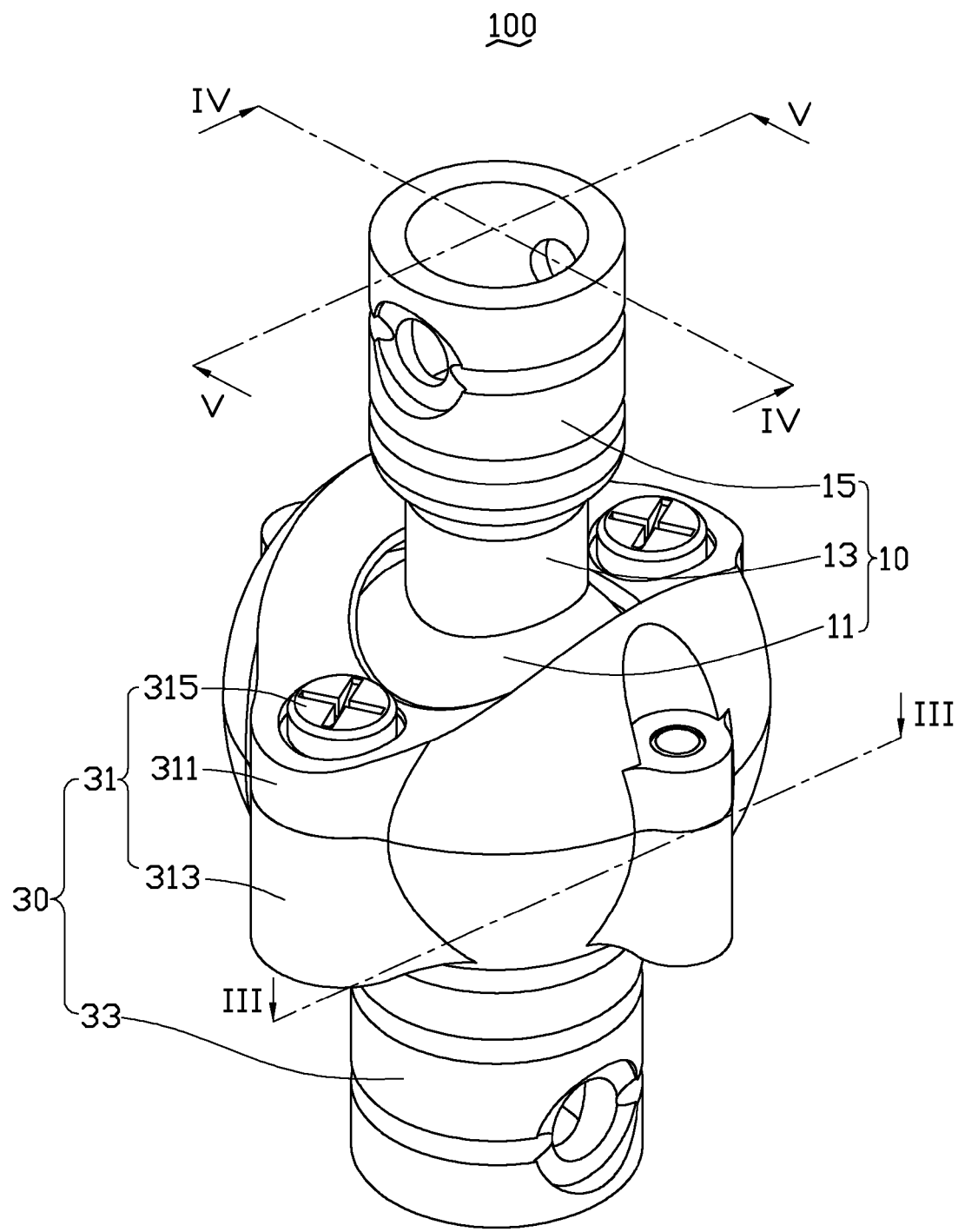
FIG. 1 is an assembled isometric view of an embodiment of a ball joint.
Figure 2:
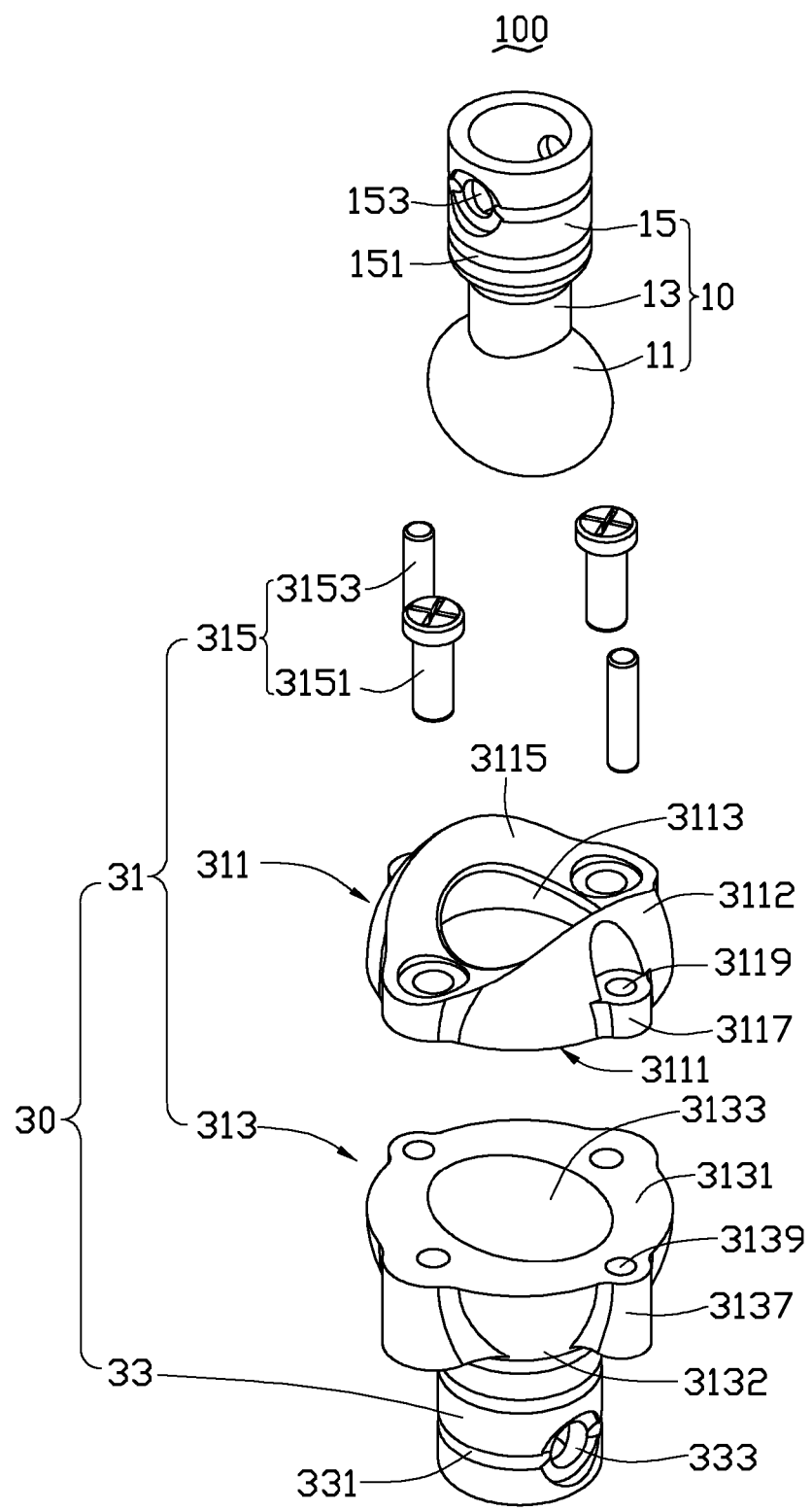
FIG. 2 is an exploded isometric view of the universal ball joint shown in FIG. 1.

Referring to FIGS. 1 and 2, an embodiment of a universal ball joint 100 includes a first pivotal body 10 and a second pivotal body 30 rotatably assembled with the first pivotal body 10.

Figure 3:
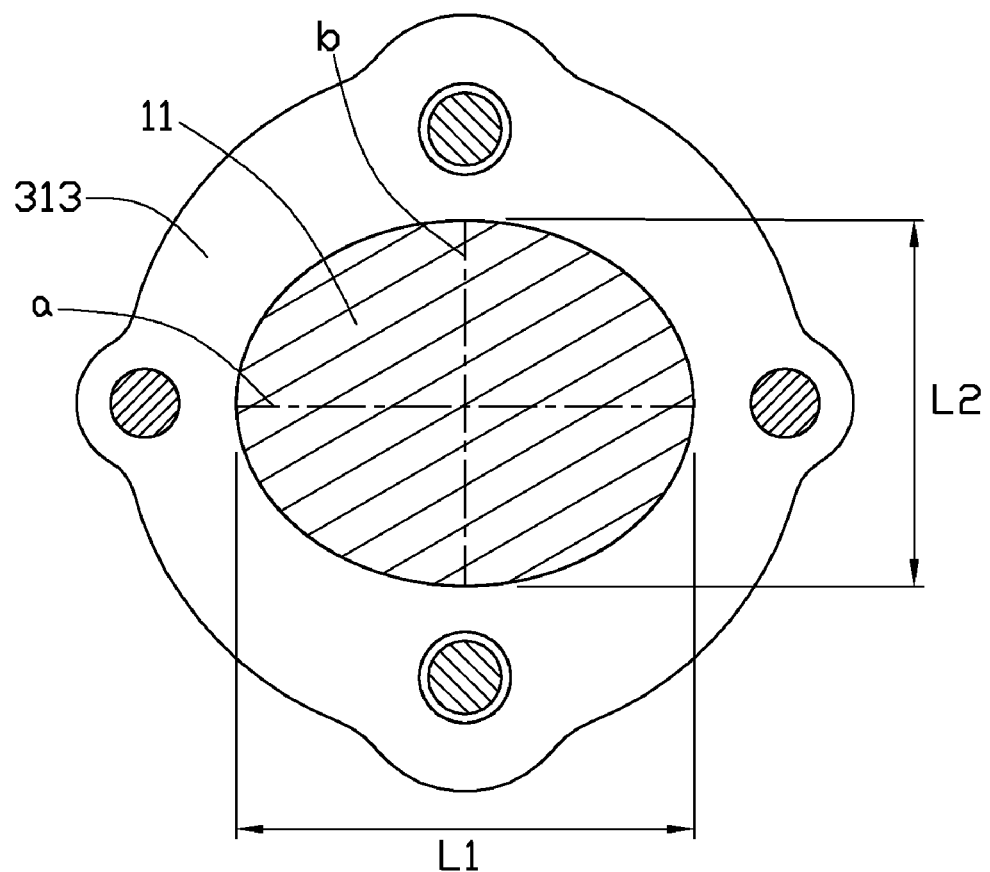
FIG. 3 is a cross-sectional view of the universal ball joint taken along line III-III of FIG. 1.
Figure 4:
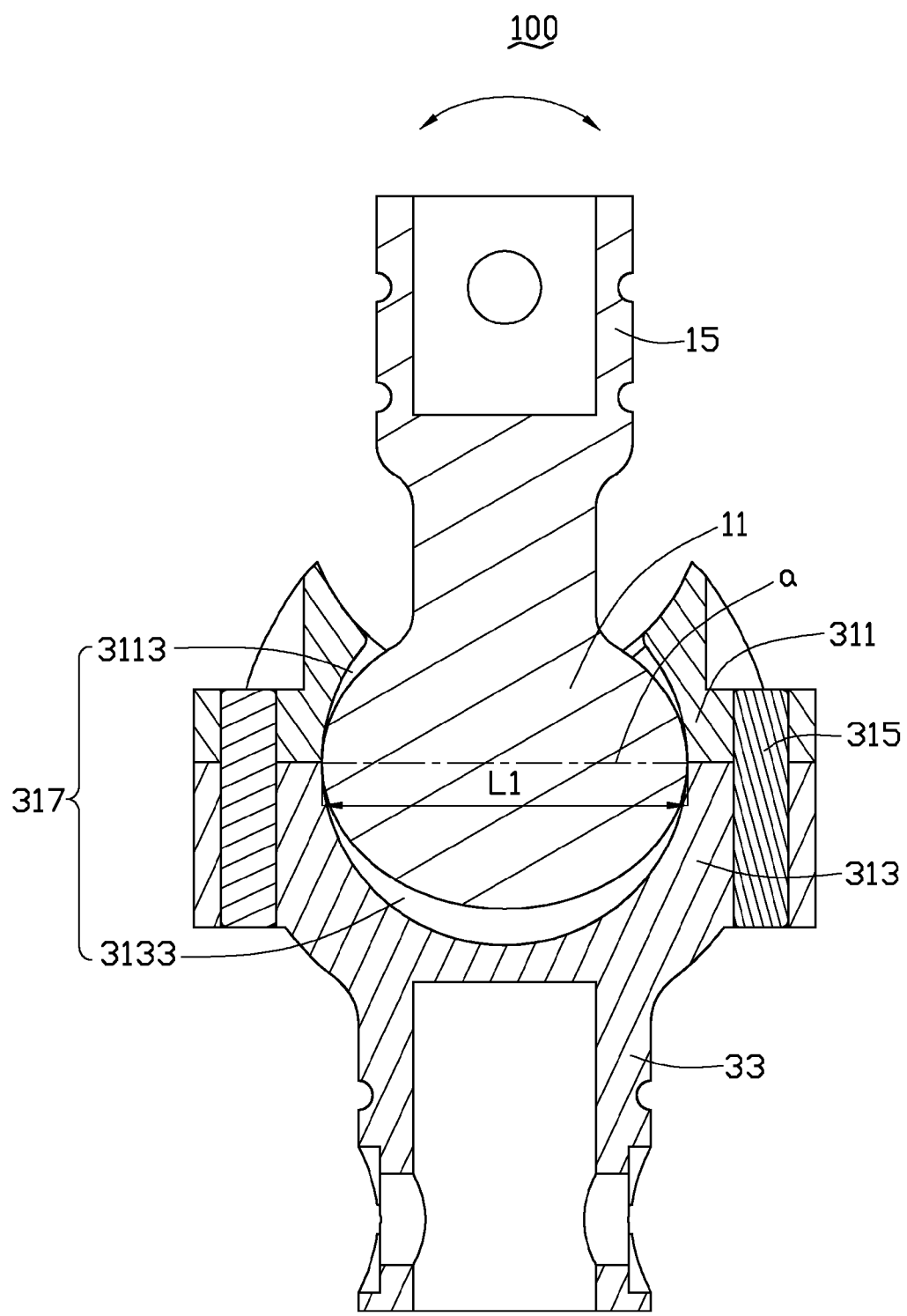
FIG. 4 is a cross-sectional view of the universal ball joint taken along line IV-IV of FIG. 1.
Figure 5:
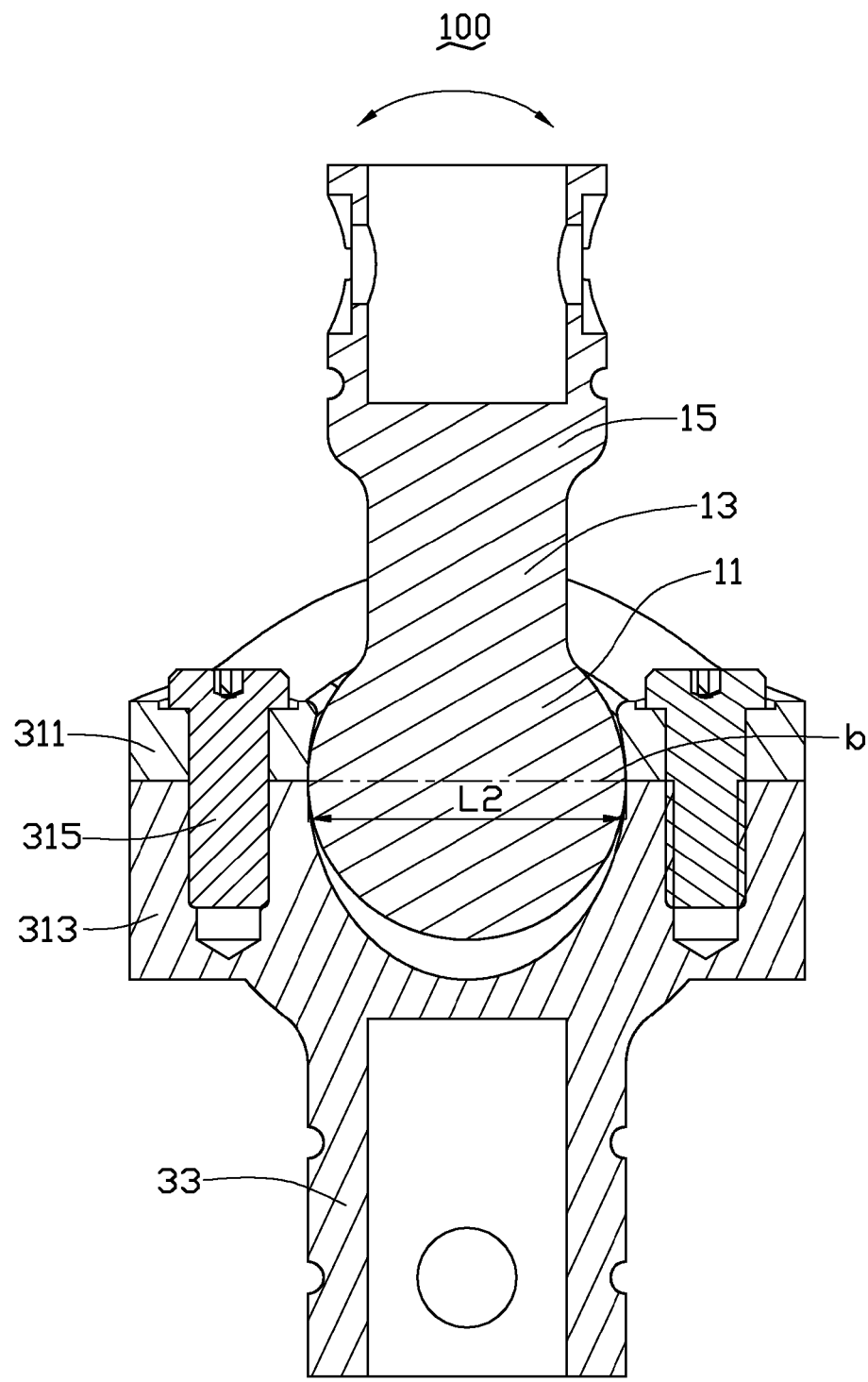
FIG. 5 is a cross-sectional view of the universal ball joint taken along line V-V of FIG. 1.

Also referring to FIGS. 3 through 5, the first pivotal body 10 includes a ball head 11, a neck portion 13 and a connecting portion 15. The ball head 11 is substantially ellipsoidal and has a major axis a with a length L1 and a minor axis b substantially perpendicular to the major axis a, with a length L2 shorter than that of the major axis a (shown in FIG. 3). The substantially cylindrical neck portion 13 is formed on the ball head 11 and is substantially perpendicular to the major axis a. The connecting portion 15 is a substantially hollow cylindrical shaft formed at the distal end of the neck portion 13 and substantially coaxial. At least one annular slot 151 is recessed from an outer periphery of the connecting portion 15. In the illustrated embodiment, there are two annular slots 151 separately recessed from the outer periphery of the connecting portion 15. Two fixing holes 153 are oppositely defined through the outer periphery of the connecting portion 15 and communicate with one annular slot 151.

The second pivotal body 30 includes a ball cover 31 and a connecting arm 33 connecting with the ball cover 31. The ball cover 31 defines a ball socket 317 (shown in FIG. 4) for rotatably receiving the ball head 11 of the first pivotal body 10. In the illustrated embodiment, the ball cover 31 shows a detachable structure and includes a first cover 311, a second cover 313, and a fastener assembly 315. The first cover 311 and the second cover 313 are assembled together via the fastener assembly 315 and cooperatively define the ball socket 317.

The first cover 311 is a substantially hollow shell having a substantially circular mating end 3111 and a substantially spherical end 3112. A substantially semielliptical accommodating cavity 3113 is recessed from the mating end 3111 of the first cover 311. A cupped cutout 3115 is recessed from the spherical end 3112 of the first cover 311 to communicate with the accommodating cavity 3113. Four assembly portions 3117 are separately formed at an outer peripheral wall (not labeled) of the first cover 311 and positioned surrounding the accommodating cavity 3113. Each assembly portion 3117 defines an assembly hole 3119.

The second cover 313 is also a substantially hollow shell having a substantially circular mating end 3131 and a substantially spherical end 3132. A substantially semielliptical accommodating cavity 3133 is recessed from the mating end 3131 of the second cover 313 corresponding to the accommodating cavity 3113 of the first cover 311 such that as the first cover 311 and the second cover 313 are assembled together via the fastener assembly 315, with the mating end 3111 of the first cover 311 resisting the mating end 3131 of the second cover 313, the two accommodating cavities 3113, 3133 cooperatively define the substantially elliptical ball socket 317 corresponding to the ball head 11. Four assembly portions 3137 are formed at a peripheral wall (not labeled) of the second cover 313 and positioned by surrounding the accommodating cavity 3133. Each assembly portion 3137 defines an assembly hole 3139.

The fastener assembly 315 includes two bolts 3151 and two pins 3153.

The connecting arm 33 is a substantially hollow cylindrical shaft formed at the spherical end 3132 of the second cover 313 substantially perpendicular to the mating end 3131 thereof. At least one annular slot 331 is recessed from an outer periphery of the connecting arm 33. In the illustrated embodiment, there are two annular slots 331 separately recessed from the outer periphery of the connecting arm 33. Two fixing holes 333 are oppositely defined through the outer periphery of the connecting arm 33 and communicate with one annular slot 331.

During assembly of the universal ball joint 100, the ball head 11 of the first pivotal body 10 aligns with and is received in the accommodating cavity 3133 of the second cover 313, thereby forming a free clearance between the distal end of the ball head 11 and the bottom of the accommodating cavity 3133 of the second cover 313 for injecting lubricant thereinto. The first cover 311 is sleeved on the first pivotal body 10 from the connecting portion 15 end of the first pivotal body 10, the mating end 3111 of the first cover 311 resists the mating end 3131 of the second cover 313, such that the whole ball head 11 of the first pivotal body 10 is rotatably received within the ball socket 317 of the ball cover 311. The two bolts 3151 and the two pins 3153 of the fastener assembly 315 respectively oppositely pass through the four assembly holes 3119 of the first cover 311 and are fixed to the corresponding four assembly holes 3139 of the second cover 313 to finish the assembly of the universal ball joint 100.

In use, when external force is provided to the connecting portion 15 of the first pivotal body 10 or the connecting arm 33 of the second pivotal body 30, the ball head 11 of the first pivotal body 10 rotatably engages with the ball socket 317 of the ball cover 31 of the second pivotal body 30 along a major axis a direction or a minor axis b direction relative to the ball cover 31, to fulfill the multi-angle rotation. Because the ball head 11 and the ball socket 317 are substantially elliptical, the ball head 11 cannot rotate along an axis of the connecting portion 15, thus the universal ball joint 100 can transmit high torsional torque in use.

It is to be understood, however, that even through numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A universal ball joint, comprising:
    a first pivotal body comprising a substantially elliptical ball head having a major axis and a minor axis substantially perpendicular to the major axis, and a connecting portion extending out from the ball head; and
    a second pivotal body rotatably assembled with the first pivotal body, wherein the second pivotal body comprises a ball cover and a connecting arm connecting with the ball cover and being substantially coaxial with the connecting portion of the first pivotal body, the ball cover comprises a first cover and a second cover detachably assembled to the first cover, the first cover and the second cover are two substantially hollow shells cooperatively defining an elliptical ball socket for rotatably engaging and receiving the ball head of the first pivotal body, such that the ball head is rotatable around the major axis and the minor axis of the ball head.

2. The universal ball joint of claim 1, wherein the first cover and the second cover each has a substantially circular mating end and an opposite substantially spherical end; each mating end defines a substantially semi-elliptic accommodating cavity therein, the two mating ends resist against each other and the two accommodating cavities cooperatively define the substantially elliptical ball socket for receiving the corresponding ball head of the first pivotal body; the connecting arm is formed at the spherical end of the second cover substantially perpendicular to the mating end thereof.

3. The universal ball joint of claim 2, wherein the first cover and the second cover each further comprises four assembly portions separately formed at an outer peripheral wall thereof and positioned surrounding the corresponding accommodating cavity; the universal ball joint further comprises a fastener assembly, and the first and second covers are assembled together via the fastener assembly.

4. The universal ball joint of claim 2, wherein the first cover comprises a cupped cutout recessed from the opposite spherical end thereof to communicate with the accommodating cavity, and the first cover sleeves on the first pivotal body with the connecting portion exposed from the cupped cutout.

5. The universal ball joint of claim 2, wherein the first pivotal body further comprises a neck portion formed between the ball head and the connecting portion, and is substantially coaxial with the connecting portion.

6. The universal ball joint of claim 2, wherein the connecting portion and the connecting arm are two substantially hollow cylindrical shafts, and each comprises at least one annular slot recessed from an outer periphery thereof.

7. The universal ball joint of claim 6, wherein the connecting portion and the connecting arm each comprises two fixing holes oppositely defined through the outer periphery thereof and communicating with one annular slot.

8. The universal ball joint of claim 6, wherein the distal end of the ball head and the bottom of the ball socket of the second pivotal body cooperatively defines a free clearance therebetween.

9. A universal ball joint, comprising:
    a first pivotal body comprising:
        a substantially elliptical ball head;
        a neck portion formed on the ball head; and
        a connecting portion formed at the distal end of the neck portion and substantially coaxial with the neck portion; and
    a second pivotal body comprising a first cover, a second cover, and a fastener assembly; wherein the first cover and the second cover are both substantially hollow hemispheric and assembled together via the fastener assembly to cooperatively define a substantially elliptical ball socket, the ball socket rotatably engages with the ball head of the first pivotal body along two different rotary axes, thereby forming a free clearance between the distal end of the ball head and the bottom of the ball socket of the second pivotal body.

10. The universal ball joint of claim 9, wherein the first cover and the second cover each has a mating end and an opposite spherical end; each mating end defines a semielliptical accommodating cavity therein, the two mating ends resist against each other and the two accommodating cavities cooperatively define the substantially elliptical ball socket for receiving the ball head of the first pivotal body.

11. The universal ball joint of claim 10, wherein the second pivotal body further comprises a connecting arm formed at the spherical end of the second cover substantially perpendicular to the cross section thereof.

12. The universal ball joint of claim 11, wherein the connecting portion and the connecting arm each comprises two annular slots recessed from an outer periphery thereof.

13. The universal ball joint of claim 11, wherein the connecting portion and the connecting arm each comprises two fixing holes oppositely defined through the outer periphery thereof.

* * * * *